United States Patent
Maeda et al.

(10) Patent No.: US 11,814,476 B2
(45) Date of Patent: Nov. 14, 2023

(54) POLYESTER ELASTOMER RESIN COMPOSITION

(71) Applicant: TOYOBO CO., LTD., Osaka (JP)

(72) Inventors: Yuki Maeda, Shiga (JP); Takuya Akaishi, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 575 days.

(21) Appl. No.: 16/769,710

(22) PCT Filed: Dec. 6, 2018

(86) PCT No.: PCT/JP2018/044845
§ 371 (c)(1),
(2) Date: Jun. 4, 2020

(87) PCT Pub. No.: WO2019/111984
PCT Pub. Date: Jun. 13, 2019

(65) Prior Publication Data
US 2020/0377649 A1 Dec. 3, 2020

(30) Foreign Application Priority Data
Dec. 8, 2017 (JP) ................................. 2017-235876

(51) Int. Cl.
C08G 63/183 (2006.01)
C08G 63/668 (2006.01)
C08K 5/20 (2006.01)
C08L 71/02 (2006.01)

(52) U.S. Cl.
CPC ......... *C08G 63/183* (2013.01); *C08G 63/668* (2013.01); *C08K 5/20* (2013.01); *C08L 71/02* (2013.01); *C08G 2350/00* (2013.01)

(58) Field of Classification Search
None
See application file for complete search history.

(56) References Cited

U.S. PATENT DOCUMENTS

| 5,733,986 A * | 3/1998 | Senda | ...... F16D 3/845 528/80 |
| 6,242,560 B1 * | 6/2001 | Gyobu | ...... C08G 63/672 528/271 |
| 2010/0249287 A1 * | 9/2010 | Schmidt | ...... C08K 5/349 524/186 |

FOREIGN PATENT DOCUMENTS

| EP | 0784079 A2 | * | 7/1997 | |
| JP | 5-279557 | | 10/1993 | |
| JP | 10-81815 | | 3/1998 | |
| JP | 2000-159991 | | 6/2000 | |
| JP | 2000-186765 | | 7/2000 | |
| JP | 2000212405 A | * | 8/2000 | |
| JP | 2000-281766 | | 10/2000 | |
| JP | 2000-334748 | | 12/2000 | |
| JP | 2001-106885 | | 4/2001 | |
| JP | 2001106885 A | * | 4/2001 | |
| JP | 2004-202998 | | 7/2004 | |
| JP | 2006-45508 | | 2/2006 | |
| JP | 201109400 A | * | 5/2011 | |
| JP | 5256737 B2 | * | 8/2013 | ............ C08L 67/025 |
| JP | 2015-86367 | | 5/2015 | |
| JP | 2016-108511 | | 6/2016 | |
| WO | WO-2018019614 A1 | * | 2/2018 | ............... C08K 5/20 |

OTHER PUBLICATIONS

Office Action dated May 18, 2022 in corresponding Korean Patent Application No. 10-2020-7019348, with English translation.
Office Action dated May 19, 2021 in corresponding Indian Patent Application No. 202017026494, with English-language translation.
International Search Report dated Feb. 19, 2019 in International (PCT) Application No. PCT/JP2018/044845.

* cited by examiner

*Primary Examiner* — Lee E Sanderson
(74) *Attorney, Agent, or Firm* — WENDEROTH, LIND & PONACK, L.L.P.

(57) ABSTRACT

A polyester elastomer resin composition having excellent anti-noise properties and wear resistance that achieves sustained wear resistance over a long period of time; enables lubricants to bleed out even in a low-temperature environment, so that the effects of the lubricants are maintained; and further prevents the lubricants from being dissolved in water, even when a molded article is washed with water. The polyester elastomer resin composition comprises a polyester elastomer (A), an aliphatic amide compound (B), and a copolyether (C), wherein the polyester elastomer (A) comprises a hard segment and a soft segment, the hard segment comprising a polyester that comprises, as constituents, an aromatic dicarboxylic acid and an aliphatic and/or alicyclic diol, the soft segment being at least one member selected from aliphatic polyethers, aliphatic polyesters, and aliphatic polycarbonates; the copolyether (C) comprises two or more different types of alkylene units and has a number average molecular weight of 1500 to 5000; and the aliphatic amide compound (B) is present in an amount of 0.01 to 1 part by mass, and the copolyether (C) is present in an amount of 0.1 to 10 parts by mass, per 100 parts by mass of the polyester elastomer (A).

5 Claims, No Drawings

POLYESTER ELASTOMER RESIN COMPOSITION

TECHNICAL FIELD

The present invention relates to a polyester elastomer resin composition. More specifically, the present invention relates to a resin composition that makes it possible to obtain an extrusion-molded article, blow-molded article, and injection-molded article that are excellent in wear resistance, anti-noise properties, and adherence at low temperature.

BACKGROUND ART

In order to impart wear resistance to a thermoplastic polyester elastomer, there have been attempts to add a solid lubricant, such as a fatty acid amide compound (Patent Literature 1 and 2).

There have also been attempts to add, as a liquid lubricant, a polyether composed of one type of constituent unit or a copolyether (copolymerized polyether) composed of two or more different types of alkylene units, in a small amount (Patent Literature 3 and 4).

In a method in which a solid lubricant is added, as in Patent Literature 1 and 2, the lubricant quickly bleeds out on the molded article surface to impart short-term wear resistance. However, the solid lubricant present on the surface is scraped off during a long-term sliding test, and continuous wear resistance cannot be exhibited. Moreover, if water is present on a part of the molded article surface where the lubricant has been scraped off, local variation in the frictional state on the molded article surface arises. This causes a vibration sound, resulting in a phenomenon called "noise."

In a method in which a polyether composed of one type of constituent unit is added, as in Patent Literature 3, the lubricant remains on the molded article surface continuously for a long period of time. However, the liquid lubricant solidifies at low temperature due to its structure. Thus, an effect on anti-noise properties cannot be exhibited at low temperature. In Patent Literature 4, since the crystallinity of the lubricant is suppressed compared with that of a polyether composed of one type of constituent unit, the lubricant is liquid at low temperature, and satisfies the above characteristic. However, when the molded article surface is washed with water, the polyether component contained therein, which is hydrophilic, is dissolved in water or washed away by water; and the lubricant is easily scraped off from the molded article surface, resulting in the generation of noise at the start of sliding.

CITATION LIST

Patent Literature

PTL 1: JPH05-279557A
PTL 2: JP2000-186765A
PTL 3: JP2000-159991A
PTL 4: JP2001-106885A

SUMMARY OF INVENTION

Technical Problem

An object of the present invention is to provide a polyester elastomer resin composition having excellent anti-noise properties and wear resistance that achieves sustained wear resistance over a long period of time; enables lubricants to bleed out even in a low-temperature environment, so that the effects of the lubricants are maintained; and further prevents the lubricants from being dissolved in water, even when a molded article is washed with water.

Solution to Problem

In order to achieve the above object, the present inventors conducted extensive research, and found a technique in which, by adding two or more lubricants having different properties, long-term stable wear resistance and anti-noise properties are provided without the lubricants being adhered at low temperature or being easily removed from the molded article surface during water-washing. Thus, the present inventors have proposed the present invention. Specifically, the present invention is as follows.

[1] A polyester elastomer resin composition comprising:
  a polyester elastomer (A);
  an aliphatic amide compound (B); and
  a copolyether (C),
wherein the polyester elastomer (A) comprises a hard segment and a soft segment, the hard segment comprising a polyester that comprises, as constituents, an aromatic dicarboxylic acid and an aliphatic and/or alicyclic diol, the soft segment being at least one member selected from aliphatic polyethers, aliphatic polyesters, and aliphatic polycarbonates,
  the copolyether (C) comprises two or more different types of alkylene units and has a number average molecular weight of 1500 to 5000, and
  the aliphatic amide compound (B) is present in an amount of 0.01 to 1 part by mass, and the copolyether (C) is present in an amount of 0.1 to 10 parts by mass, per 100 parts by mass of the polyester elastomer (A).

[2] The polyester elastomer resin composition according to [1], wherein the polyester elastomer (A) comprises terephthalic acid, 1,4-butanediol, and poly(tetramethylene oxide) glycol as main components, the poly(tetramethylene oxide) glycol has a number average molecular weight of 500 to 4000, and the copolymerization amount of the poly(tetramethylene oxide) glycol is 5 to 50 mol % of the entire glycol component.

[3] The polyester elastomer resin composition according to [1] or [2], wherein the aliphatic amide compound (B) is an aliphatic monoamide compound or aliphatic bisamide compound.

In the present invention, the aliphatic amide compound (B) and the copolyether (C) comprising two or more different types of alkylene units may each be referred to as the "lubricant."

Advantageous Effects of Invention

The present invention provides a polyester elastomer resin composition having excellent wear resistance and anti-noise properties, since the solid lubricant and the liquid lubricant stably bleed out on a surface layer.

DESCRIPTION OF EMBODIMENTS

Polyester Elastomer (A)

The polyester elastomer (A) used in the present invention comprises a hard segment and a soft segment, the hard segment comprising a polyester that comprises, as constituents, an aromatic dicarboxylic acid and an aliphatic and/or alicyclic diol; and the soft segment being at least one member selected from aliphatic polyethers, aliphatic polyesters, and aliphatic polycarbonates.

The aromatic dicarboxylic acid that constitutes the polyester of the hard segment may be a widely used common aromatic dicarboxylic acid, and the aromatic dicarboxylic acid is not particularly limited. The main aromatic dicarboxylic acid is preferably terephthalic acid or naphthalenedicarboxylic acid. Other acid components include aromatic dicarboxylic acids, such as diphenyldicarboxylic acid, isophthalic acid, and sodium 5-sulfoisophthalate; alicyclic dicarboxylic acids, such as cyclohexanedicarboxylic acid and tetrahydrophthalic anhydride; aliphatic dicarboxylic acids, such as succinic acid, glutaric acid, adipic acid, azelaic acid, sebacic acid, dodecanedioic acid, dimer acid, and hydrogenated dimer acid; and the like. The other acid components can be used to such an extent that the other acid components do not significantly decrease the melting point of the polyester elastomer (A); and the amount thereof is less than 30 mol %, and preferably less than 20 mol %, of the total acid components.

The aliphatic or alicyclic diol that constitutes the polyester of the hard segment may be a widely used common aliphatic or alicyclic diol, and the aliphatic or alicyclic diol is not particularly limited. The main aliphatic or alicyclic diol preferably include $C_{2-8}$ alkylene glycols. Specific examples include ethylene glycol, 1,3-propylene glycol, 1,4-butanediol, 1,6-hexanediol, 1,4-cyclohexanedimethanol, and the like. Of these, 1,4-butanediol and 1,4-cyclohexanedimethanol are preferable.

The component that forms the polyester of the hard segment is preferably one formed of a butylene terephthalate unit (a unit formed from terephthalic acid and 1,4-butanediol) or a butylene naphthalate unit (a unit formed from 2,6-naphthalenedicarboxylic acid and 1,4-butanediol) from the standpoint of physical properties, moldability, and cost performance.

The soft segment is at least one member selected from aliphatic polyethers, aliphatic polyesters, and aliphatic polycarbonates. Examples of aliphatic polyethers include poly(ethylene oxide) glycol, poly(propylene oxide) glycol, poly(tetramethylene oxide) glycol, poly(hexamethylene oxide) glycol, poly(trimethylene oxide) glycol, copolymers of ethylene oxide with propylene oxide, ethylene oxide adducts of poly(propylene oxide) glycol, copolymers of ethylene oxide with tetrahydrofuran, and the like.

Examples of aliphatic polyesters include poly(ε-caprolactone), polyenantholactone, polycaprylolactone, polybutylene adipate, and the like. Of these aliphatic polyethers and/or aliphatic polyesters, poly(tetramethylene oxide) glycol, ethylene oxide adducts of poly(propylene oxide) glycol, poly(ε-caprolactone), polybutylene adipate, and the like are preferable from the standpoint of elastic properties of the obtained polyester elastomer (A). Of these, poly(tetramethylene oxide) glycol is particularly preferable.

The aliphatic polycarbonates are preferably those mainly formed from $C_{2-12}$ aliphatic diol residues. Examples of these aliphatic diols include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, 2-methyl-1,8-octanediol, and the like. In particular, $C_{5-12}$ aliphatic diols are preferable from the standpoint of flexibility and low-temperature properties of the obtained polyester elastomer. These components may be used singly or in a combination of two or more where necessary, with reference to the descriptions below.

The aliphatic polycarbonate diols are preferably those having a low melting point (e.g., 70° C. or less) and a low glass-transition temperature. An aliphatic polycarbonate diol formed from 1,6-hexanediol, which is typically used for forming the soft segment of a polyester elastomer, has a glass-transition temperature of as low as about −60° C., and a melting point of about 50° C., thus exhibiting excellent low-temperature properties. An aliphatic polycarbonate diol obtained by copolymerizing the aliphatic polycarbonate diol, for example, with a suitable amount of 3-methyl-1,5-pentanediol, is also considered to have excellent low-temperature properties due to its decreased melting point or amorphous structure, although the glass-transition point is slightly increased compared with that of the original aliphatic polycarbonate diol. Additionally, an aliphatic polycarbonate diol formed from 1,9-nonanediol and 2-methyl-1,8-octanediol, for example, is considered to have excellent low-temperature properties because of its melting point of about 30° C. and a sufficiently low glass-transition temperature of about −70° C.

The polyester elastomer (A) used in the present invention is preferably a copolymer comprising terephthalic acid, 1,4-butanediol, and poly(tetramethylene oxide) glycol as main components. In the dicarboxylic acid component that constitutes the polyester elastomer (A), terephthalic acid is preferably present in an amount of 40 mol % or more, more preferably 70 mol % or more, even more preferably 80 mol % or more, and particularly preferably 90 mol % or more. In the glycol component that constitutes the polyester elastomer (A), 1,4-butanediol and poly(tetramethylene oxide) glycol are preferably present in a total amount of 40 mol % or more, more preferably 70 mol % or more, even more preferably 80 mol % or more, and particularly preferably 90 mol % or more.

The poly(tetramethylene oxide) glycol preferably has a number average molecular weight of 500 to 4000. A number average molecular weight of less than 500 may make it unlikely to develop elastic properties. However, a number average molecular weight of more than 4000 may lead to decreased compatibility with the polyester part of the hard segment, resulting in difficulty in forming a block copolymer. The poly(tetramethylene oxide) glycol more preferably has a number average molecular weight of 800 or more and 3000 or less, and even more preferably 1000 or more and 2500 or less.

The copolymerization amount of the poly(tetramethylene oxide) glycol is preferably 5 to 50 mol % of the entire glycol component that constitutes the polyester elastomer (A). The poly(tetramethylene oxide) glycol is more preferably 5 mol % or more and 30 mol % or less, even more preferably 5 mol % or more and 20 mol % or less, particularly preferably 7 mol % or more and 18 mol % or less, and most preferably 8 mol % or more and 15 mol % or less of the entire glycol component.

In the polyester elastomer (A) used in the present invention, the ratio (parts by mass) of the hard segment to the soft segment (the hard segment:the soft segment) is generally preferably 30:70 to 95:5, more preferably 40:60 to 90:10, even more preferably 45:55 to 87:13, and particularly preferably 50:50 to 85:15.

The polyester elastomer (A) used in the present invention preferably has a reduced viscosity of 0.5 dl/g or more and 3.5 dl/g or less, as measured by the measurement method described later. A reduced viscosity of less than 0.5 dl/g may lead to low durability of the resin, while a reduced viscosity of more than 3.5 dl/g may result in insufficient processability, such as in injection-molding. The polyester elastomer (A) more preferably has a reduced viscosity of 1.0 dl/g or more and 3.0 dl/g or less, and even more preferably 1.5 dl/g or more and 2.8 dl/g or less. The acid value is preferably 200 eq/t or less, and more preferably 50 eq/t or less.

The polyester elastomer (A) preferably has a melting point of 150 to 230° C., and more preferably 175 to 210° C. If the melting point of the polyester elastomer (A) is less than 150° C., the heat resistance may be reduced due to a large amount of the soft segment. If the melting point of the polyester elastomer (A) is more than 230° C., the flexibility may be reduced due to a large amount of the hard segment.

The polyester elastomer (A) used in the present invention can be produced by a known method (e.g., JPH10-182954A or WO2007/072748). For example, any of the following methods may be used: a method in which a diester formed from a dicarboxylic acid and a lower alcohol, an excessive amount of a low-molecular-weight glycol, and a soft segment component are subjected to transesterification in the presence of a catalyst, and the obtained reaction product is subjected to polycondensation; a method in which a dicarboxylic acid, an excessive amount of a glycol, and a soft segment component are subjected to esterification in the presence of a catalyst, and the obtained reaction product is subjected to polycondensation; a method in which the hard segment is prepared beforehand, and a soft segment component is added to this hard segment to prepare a randomized copolymer by transesterification; a method in which the hard segment and the soft segment are linked with a chain-linking agent; and when poly(ε-caprolactone) is used for the soft segment, a method in which an addition reaction of a ε-caprolactone monomer with the hard segment is performed.

Aliphatic Amide Compound (B)

The aliphatic amide compound (B) used in the present invention is an amide compound having one or more amide groups (—NH—CO—), wherein at least one of the substituent on the NH side and the substituent on the CO side is an aliphatic group. The aliphatic amide compound (B) is preferably a compound in which both the substituent on the NH side and the substituent on the CO side are an aliphatic group. The aliphatic amide compound (B) is preferably at least one compound selected from aliphatic monoamide compounds having one amide group and aliphatic bisamide compounds having two amide groups.

As the aliphatic amide compound (B), an aliphatic monoamide compound represented by the following formula (1) and an aliphatic bisamide compound represented by the following formula (2) or (3) can be preferably used.

$R^1$ and $R^2$ in formula (1) each represent any of an alicyclic group having 6 or more carbon atoms, a saturated aliphatic hydrocarbon group having 6 or more carbon atoms, and an unsaturated aliphatic hydrocarbon group having 6 or more carbon atoms. $R^1$ and $R^2$ preferably each have 6 to 30 carbon atoms, more preferably 12 to 25 carbon atoms, and even more preferably 12 to 20 carbon atoms. At least one of $R^1$ and $R^2$ is preferably an unsaturated aliphatic hydrocarbon group. For example, in the case of $R^2$, examples of the saturated aliphatic hydrocarbon group includes capryl, lauryl, palmityl, stearyl, isostearyl, behenyl, and the like; examples of the unsaturated aliphatic hydrocarbon group include oleyl, erucyl, and the like; and examples of the alicyclic group include cyclohexyl and the like. For example, in the case of $R^1$, examples of the saturated fatty acid structure including the CO portion include a capric acid structure, a lauric acid structure, a palmitic acid structure, a stearic acid structure, an isostearic acid structure, a behenic acid structure, and the like; examples of the unsaturated fatty acid structure including the CO portion include an oleic acid structure, an erucic acid structure, and the like; and examples of the alicyclic acid structure including the CO portion include a cyclohexyl carboxylic acid structure and the like.

Of these aliphatic monoamide compounds, an amide compound in which $R^1$ and $R^2$ in formula (1) each independently represent a $C_{12-25}$ saturated chain hydrocarbon group, and/or an amide compound in which at least one of $R^1$ and $R^2$ is a $C_{12-25}$ unsaturated chain hydrocarbon group is preferable. An amide compound in which $R^1$ and $R^2$ in formula (1) each independently represent a $C_{12-20}$ saturated chain hydrocarbon group, and/or an amide compound in which at least one of $R^1$ and $R^2$ is a $C_{12-20}$ unsaturated chain hydrocarbon group is more preferable; and a mixture of these two amide compounds is even more preferable. A monoamide compound in which the unsaturated chain hydrocarbon group is an oleyl group, which has 18 carbon atoms and an unsaturated bond; a monoamide compound in which the unsaturated fatty acid structure is a structure of oleic acid, which has 18 carbon atoms and an unsaturated bond; or a monoamide compound in which the unsaturated fatty acid structure is a structure of erucic acid, which has 22 carbon atoms and an unsaturated bond, is particularly preferable. Specifically, stearyl oleic acid amide, oleyl stearic acid amide, oleyl oleic acid amide, oleyl erucic acid amide, and stearyl erucic acid amide are preferable, in terms of forming and retaining a thin film on a sliding portion, and ensuring thin-film retention effective for resolving baking trouble.

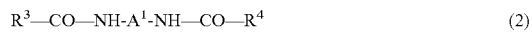

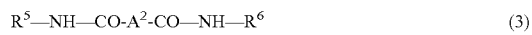

In formulas (2) and (3), $R^3$, $R^4$, $R^5$, and $R^6$ each independently represent a $C_{5-25}$ saturated or unsaturated chain hydrocarbon group, and $A^1$ and $A^2$ each represent a hydrocarbon group selected from $C_{1-10}$ alkylene group. $R^3$, $R^4$, $R^5$, and $R^6$ each preferably represent a $C_{12-20}$ saturated or unsaturated chain hydrocarbon group, and $A^1$ and $A^2$ each preferably represent a hydrocarbon group selected from $C_{1-6}$ alkylene group.

The aliphatic bisamide compound is a compound represented by formula (2) or (3) in the form of an acid amide of a diamine, or an acid amide of a dicarboxylic acid. In the hydrocarbon groups represented by $R^3$, $R^4$, $R^5$, and $R^6$, and further $A^1$ and $A^2$ in formulas (2) and (3), one or more of the hydrogen atoms may be replaced by hydroxyl (—OH).

Specific examples of the aliphatic bisamide compound represented by formula (2) include ethylene bis stearic acid amide, ethylene bis isostearic acid amide, ethylene bis oleic acid amide, methylene bis lauric acid amide, hexamethylene bis oleic acid amide, hexamethylene bis hydroxystearic acid amide, and the like. Examples of the aliphatic bisamide compound represented by formula (3) include N,N'-distearylsebacic acid amide and the like.

Among these aliphatic bisamide compounds, as in the case of the aliphatic monamide compound, an amide compound in which $R^3$ and $R^4$ in formula (2) or $R^5$ and $R^6$ in formula (3) are each independently a $C_{1}20$ saturated chain hydrocarbon group, and/or an amide compound in which at least one of $R^3$ and $R^4$, or at least one of $R^5$ and $R^6$ is a $C_{12-20}$ unsaturated chain hydrocarbon group is preferable. Further, a bisamide compound in which the saturated/unsaturated chain hydrocarbon group is a stearyl group or an oleyl group, both of which have 18 or more carbon atoms, or the saturated/unsaturated fatty acid structure is a structure of stearic acid or oleic acid, both of which have 18 or more carbon atoms, is preferable in terms of ensuring thin-film retention. Examples of the compound include ethylene bis stearic acid amide, ethylene bis oleic acid amide, hexamethylene bis oleic acid amide, and the like.

The amount (content) of the aliphatic amide compound (B) is 0.01 to 1 part by mass, preferably 0.05 to 0.7 parts by mass, and more preferably 0.05 to 0.5 parts by mass, per 100 parts by mass of the polyester elastomer (A). If the content is less than 0.01 parts by mass, the effects obtained by adding the compound, such as the effect of reducing frictional noise and the amount of wear, may not be exhibited significantly. If the content is more than 1 part by mass, the melt viscosity of the polyester elastomer may notably decrease, which makes molding difficult; the aliphatic amide compound (B) may bleed out as powdery aggregates on the surface of a molded article, which impairs the appearance thereof; or an adverse effect on assembling of a molded article, or other adverse effects such as scattering to surrounding parts, may arise.

Copolyether (C) Comprising Two or More Different Types of Alkylene Units

The copolyether (C) comprising two or more types of alkylene units is used to improve friction and wear properties. The copolyether (C) has a number average molecular weight of 1500 to 5000, and preferably 3000 to 5000. If the number average molecular weight is less than 1500, the rate of bleeding out on the surface of a molded article is high, but a sufficient effect on wear resistance and anti-noise properties cannot be obtained. If the number average molecular weight is more than 5000, the rate of bleeding out on the surface of a molded article is low; and the high molecular weight causes a sudden increase in the coefficient of friction at the start of sliding, resulting in stick-slip. The number average molecular weight can be measured by the method described in the Examples below.

As the copolyether (C) comprising two or more different types of alkylene units, a polyether compound represented by the following formula (4) can be preferably used.

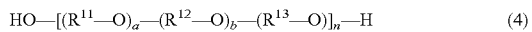

HO—[(R$^{11}$—O)$_a$—(R$^{12}$—O)$_b$—(R$^{13}$—O)]$_n$—H    (4)

In formula (4), R$^{11}$, R$^1$, and R$^1$ each represent a C$_{2-10}$ alkylene unit, R$^{12}$ is different from R$^{11}$ and R$^{13}$, and R$^{11}$ and R$^{13}$ may be the same or different. a, b, and c each represent an integer of 0 or more that satisfies a+b+c≥2 (b is 1 or more, and at least one of a and c is 1 or more), and n represents an integer of 1 or more that achieves the copolyether (C) having a number average molecular weight 1500 to 5000 (provided that the values of a, b, and c may individually vary among repeated brackets). Examples of R$^{11}$, R$^2$, and R$^1$ include ethylene, propylene, trimethylene, tetramethylene, neopentylene, and hexamethylene units. The two or more different types of alkylene units preferably include an ethylene unit and a propylene unit. In this case, the ratio of the ethylene unit to the propylene unit is not particularly limited. The ratio of the ethylene unit to the propylene unit (ethylene oxide unit:propylene oxide unit) is preferably 10:90 to 90:10 (molar ratio), and more preferably 20:80 to 70:30 (molar ratio).

Specific examples include copolymers of ethylene oxide and propylene oxide, ethylene oxide addition polymers of poly(propylene oxide) glycol, copolymers of ethylene oxide and tetrahydrofuran, copolymers of propylene oxide and tetrahydrofuran, ethylene oxide addition polymers of copolymers of propylene oxide and tetrahydrofuran, ethylene oxide addition polymers of poly(tetramethylene oxide) glycol, copolymers of neopentyl oxide and ethylene oxide, copolymers of neopentyl oxide and propylene oxide, ethylene oxide addition polymers of copolymers of neopentyl oxide and propylene oxide, copolymers of neopentyl oxide and tetrahydrofuran, ethylene oxide addition polymers of copolymers of neopentyl oxide and tetrahydrofuran, ethylene oxide addition polymers of poly(neopentyl oxide) glycol, and the like. Of these, ethylene oxide addition polymers of poly(propylene oxide) glycol are preferable. The amount (content) of the copolyether (C) may vary depending on the affinity for the polyester elastomer (A) used, or the required characteristics of the ultimately obtained composition. These compounds may be used in a combination of two or more, or may be used in combination with other lubricant components.

It is preferred that the amount (content) of the copolyether (C) comprising two or more types of alkylene units be 0.1 to 10 parts by mass, preferably 0.3 to 5 parts by mass, and more preferably 1 to 5 parts by mass, per 100 parts by mass of the polyester elastomer (A). If the content is less than 0.1 parts by mass, the effects obtained by adding the compound, such as the effect of reducing frictional noise and the amount of wear, may not be exhibited significantly. If the content is more than parts by mass, the melt viscosity of the polyester elastomer may notably decrease, which makes molding difficult; the compound may ooze considerably from the molded article surface, which impairs the appearance thereof; or adverse effects such as scattering to surrounding parts may arise.

Excellent wear resistance and low-noise properties at low temperature are obtained by adding the copolyether (C) composed of two or more types of alkylene units, because the copolyether (C) has a crystallinity lower than that of a polyether composed of one type of constituent unit (i.e., comprising one type of alkylene unit) and is in liquid form at low temperature. Further, since the two or more types of alkylenes form the polyether, and the copolyether is an assembly of so many different kinds of molecules having different characteristics viewed on the molecular level along with molecular-weight distribution, the polyether can easily bleed out from the polyester elastomer gradually, making it possible to exhibit wear resistance and noise reduction effects over a long period of time.

The reason the liquid lubricant (copolyether (C)) is not scraped off from the molded article surface during high-pressure water-washing when the aliphatic amide compound (B) and the copolyether (C) comprising two or more different types of alkylene units are used in combination is considered to be as follows. The aliphatic amide compound (B) has a molecular weight lower than that of the copolyether (C), exhibits complete hydrophobicity compared with the copolyether (C) (which is obtained by copolymerizing hydrophilic and hydrophobic groups in a large amount), and contains amide group(s) in its structure. Thus, the aliphatic amide compound (B) has poor compatibility with polyester elastomer (A), bleeds out on the molded article surface earlier than the copolyether (C), and contributes to formation of a lubrication film in the outermost layer. Further, due to the appropriate interaction between the polyester elastomer (A) and the copolyether (C), and the appropriate interaction between the copolyether (C) and the aliphatic amide compound (B), these lubricants are considered to stably bleed out on the molded article surface layer; this enables wear resistance and noise reduction effects to be exhibited over a long period of time.

The method for producing the resin composition of the present invention includes a method comprising melt-kneading the components with a single- or twin-screw melt kneader, or a typical mixer for thermoplastic resin, such as a kneading heater; and subsequently subjecting the mixture to a granulation step to prepare pellets.

EXAMPLES

The following describes Examples to explain the present invention in more detail. However, the present invention is not limited to the Examples in any manner. The measurement values described in the Examples were measured in accordance with the following methods.

Melting Point:

A DSC220 differential scanning calorimeter produced by Seiko Instruments Inc. was used. 5 mg of a measurement sample was placed in an aluminum pan, and the pan was hermetically sealed with a pressed lid. The sample was held at 250° C. for 5 minutes to be completely molten, and was then rapidly cooled with liquid nitrogen. Thereafter, measurement was performed at a temperature rise rate of 20° C./min from −150° C. to 250° C. The endothermic peak in the obtained thermogram curve was determined to be the melting point.

Reduced Viscosity:

0.10 g of a sufficiently dried resin was dissolved in 25 ml of a mixture solvent of phenol/tetrachloroethane (mass ratio: 6/4), and measured at 30° C. with an Ubbelohde viscometer.

Acid Value:

0.2 g of a sample was precisely weighed, dissolved in 20 mL of chloroform, and titrated with 0.01N potassium hydroxide (an ethanol solution) for determining the acid value. Phenolphthalein was used for the indicator.

Number Average Molecular Weight of Copolyether (C) Comprising Two or More Different Types of Alkylene Units:

A copolyether (C) was dissolved in deuterated chloroform ($CDCl_3$)/trifluoroacetic acid (TFA) (volume ratio: 85/15), and the number average molecular weight was calculated from the spectral ratio of ethylene oxide and propylene oxide, and the amount of the terminal group obtained by 1H-NMR.

Starting materials used are as follows.

Polyester Elastomer (A)

Polyester Elastomer A1

In accordance with the method disclosed in Reference Example 1 of JPH09-059491A (paragraph [0017]), a polyester elastomer was prepared from terephthalic acid/1,4-butanediol/poly(tetramethylene oxide) glycol (PIMG; number average molecular weight: 1500) at a molar ratio of 100/88/12.

The polyester elastomer A1 had a melting point of 197° C., a reduced viscosity of 1.86 dl/g, and an acid value of 38 eq/t.

Polyester Elastomer A2

In accordance with the method disclosed in Reference Example 1 of JPH09-059491A (paragraph [0017]), a polyester elastomer was prepared from terephthalic acid/1,4-butanediol/poly(tetramethylene oxide) glycol (PTMG; number average molecular weight: 2000) at a molar ratio of 100/90/10.

The polyester elastomer A2 had a melting point of 205° C., a reduced viscosity of 2.15 dl/g, and an acid value of 35 eq/t.

Aliphatic Amide Compound (B)

(B-1) Aliphatic monoamide compound: NIKKA AMIDE OS (N-oleyl stearic acid monoamide, produced by Nippon Kasei Chemical Company Limited)

(B-2) Aliphatic monoamide compound: NIKKA AMIDE SE (N-stearyl erucic acid monoamide, produced by Nippon Kasei Chemical Company Limited)

(B-3) Aliphatic bisamide compound: SLIPACKS O (ethylene bis oleic acid amide, produced by Nippon Kasei Chemical Company Limited)

Copolyether (C) Comprising Two or More Different Types of Alkylene Units (C-1) PEG-PPG-PEG copolymer (ethylene oxide addition polymer of poly(propylene oxide) glycol): Pluronic P-85 (produced by ADEKA) (EO/PO=58/42 (molar ratio) copolymer, number average molecular weight: 3600, produced by ADEKA)

(C-2) PEG-PPG-PEG copolymer (ethylene oxide addition polymer of poly(propylene oxide) glycol): Pluronic L-121 (produced by ADEKA) (EO/PO=29/71 (molar ratio) copolymer, number average molecular weight: 4400, produced by ADEKA)

(C-3) PEG-PPG-PEG copolymer (ethylene oxide addition polymer of poly(propylene oxide) glycol): Pluronic L-31 (produced by ADEKA) (EO/PO=16/84 (molar ratio) copolymer, number average molecular weight: 1100, produced by ADEKA)

(C-4) PEG-PPG-PEG copolymer (ethylene oxide addition polymer of poly(propylene oxide) glycol): Pluronic F-68 (produced by ADEKA) (EO/PO=84/16 (molar ratio) copolymer, number average molecular weight: 8400, produced by ADEKA)

PEG represents a block composed of ethylene oxide units, and PPG represents a block composed of propylene oxide units. EO represents an ethylene oxide unit, and PO represents a propylene oxide unit.

Another Polyether (D-1) Poly(tetramethylene oxide) glycol (number average molecular weight: 3000): #PTMG3000 (produced by Mitsubishi Chemical Corporation)

Other Additives

Mold-releasing agent: Licowax E (produced by Clariant)
Antioxidant: Irganox 1010 (produced by BASF)

Examples 1 to 7 and Comparative Examples 1 to 7

The components were dry-blended at the proportions shown in Table 1, kneaded, and formed into pellets with a twin-screw extruder. The following evaluations were performed using the pellets of the polyester elastomer resin compositions. For test specimens used in evaluations of the bleed amount, water-washing, adherence at low temperature, and wear test, 100 mm-square test specimens (100 mm×100 mm×2 mmt (thickness)) were prepared with an injection-molding machine at a cylinder temperature of 240° C., and used. Table 1 shows the results.

Surface Hardness:

In accordance with the test method (Shore D) described in ASTMD2240, the surface hardness was measured at 23° C. Injection-molding was performed at a cylinder temperature of 240° C., and three 100 mm-square test specimens (100 mm×100 mm×2 mmt) were layered on top of each other. The instantaneous value of Shore D when a needle tip was dropped was read to measure the surface hardness.

Melt Viscosity (MFR):

In accordance with the test method (method A) described in JIS K7210, the melt flow rate (MFR: g/10 min) was measured at a measurement temperature of 230° C. under a load of 2160 g. For this measurement, compositions with a moisture content of 0.1 mass % or less were used.

Bleed Amount (23° C.):

100 nm-square test specimens were allowed to stand at 23° C./50% RH for 1 week. Thereafter, the mass of each molded article was measured. The surface of the molded article was then wiped carefully with a Kimwipe, and the mass of the molded article was measured again. The bleed amount of the lubricant(s) was measured from the difference between the mass before wiping and the mass after wiping.

Water-Washing:

100 mm-square test specimens were allowed to stand at 23° C./50% RH for 1 week. Thereafter, each molded article was placed in a water tank at 23° C., and left for 30 minutes. Whether the lubricant(s) remained on the surface of the molded article was then visually confirmed.

A: The lubricant(s) remained on the surface of the molded article.
B: The lubricant(s) did not remain.

Adherence at Low Temperature:

100 mm-square test specimens were allowed to stand at 23° C./50% RH for 1 week. Thereafter, molded articles were layered on top of each other, and stored in a freezer (−10° C.) for 3 days. Whether adhesion of the molded articles was observed when the molded articles were taken out was confirmed. The adherence at low temperature was evaluated according to the following criteria. If the lubricant(s) are adhered at low temperature, they cannot bleed on the surface of the molded articles, and the molded articles adhere to each other.

A: The molded articles did not adhere to each other.
B: The molded articles adhered to each other.

Wear Test (Generation of Wear Debris):

100 mm-square test specimens were allowed to stand at 23° C./50% RH for 1 week. Thereafter, the thrust wear test described in JISK7213 was performed to confirm whether wear debris was generated on the surface of each molded article. SUS-65C was used for cylindrical test specimens used for the thrust wear test, and a sliding test was performed under the conditions of load: 1.0 MPa, sliding rate: 100 rpm, test time: 60 minutes.

Noise Test (Generation of Noise):

Water was dripped on the surface of each molded article after the wear test, and the thrust wear test was performed again to confirm whether noise was generated. The cylindrical test specimens used in the thrust wear test were prepared by injection-molding the same resins as the 100 mm-square test specimens at a cylinder temperature of 240° C. The sound generated when a sliding test was performed under the conditions of load: 0.5 MPa, sliding rate: 50 rpm, and test time: 5 minutes was measured with a sound-level meter NL-20 produced by Rion Co., Ltd.

TABLE 1

| | Item | Unit | Example 1 | Example 2 | Example 3 | Example 4 | Example 5 | Example 6 | Example 7 | Comparative Example 1 |
|---|---|---|---|---|---|---|---|---|---|---|
| Composition | Polyester elastomerA1 | Parts by mass | 100 | 100 | 100 | 100 | 100 | 100 | | 100 |
| | Polyester elastomerA2 | Parts by mass | | | | | | | 100 | |
| | B-1 (NIKKA AMIDE OS) | Parts by mass | 0.3 | 0.3 | | | 0.5 | 0.1 | 0.1 | |
| | B-2 (NIKKA AMIDE SE) | Parts by mass | | | 0.3 | | | | | |
| | B-3 (SLIPACKS O) | Parts by mass | | | | 0.5 | | | | |
| | C-1 (P-85) | Parts by mass | 3.5 | | 3.5 | 3.5 | 2.0 | 2.0 | 2.0 | |
| | C-2 (L-121) | Parts by mass | | 3.5 | | | | | | |
| | C-3 (L-31) | Parts by mass | | | | | | | | |
| | C-3 (F-68) | Parts by mass | | | | | | | | |
| | D-4 (#PTMG3000) | Parts by mass | | | | | | | | |
| | Licowax E | Parts by mass | 0.2 | 0.2 | 0.2 | 0.2 | 0.2 | 0.2 | 0.2 | 0.2 |
| | Irganox 1010 | Parts by mass | 0.2 | 0.2 | 0.2 | 0.2 | 0.2 | 0.2 | 0.2 | 0.2 |
| Evaluation | Surface hardness | D | 45 | 45 | 45 | 45 | 46 | 46 | 46 | 46 |
| | MFR (230° C.) | g/10 min | 14 | 14 | 14 | 14 | 13 | 13 | 13 | 13 |
| | Bleed amount (23° C.) | mg | 15 | 10 | 8 | 16 | 9 | 7 | 10 | 0 |
| | Water-washing | — | A | A | A | A | A | A | A | — |
| | Adherence at low temperature | — | A | A | A | A | A | A | A | — |
| | Generation of wear debis | — | None | None | None | None | None | None | None | Generated |
| | Generation of noise | — | None | None | None | None | None | None | None | Generated |

| | Item | Unit | Comparative Example 2 | Comparative Example 3 | Comparative Example 4 | Comparative Example 5 | Comparative Example 6 | Comparative Example 7 |
|---|---|---|---|---|---|---|---|---|
| Composition | Polyester elastomerA1 | Parts by mass | 100 | 100 | 100 | 100 | 100 | 100 |

TABLE 1-continued

| | | | | | | | | |
|---|---|---|---|---|---|---|---|---|
| | Polyester elastomerA2 | Parts by mass | | | | | | |
| | B-1 (NIKKA AMIDE OS) | Parts by mass | 0.5 | | 0.3 | 0.3 | 0.8 | 0.8 |
| | B-2 (NIKKA AMIDE SE) | Parts by mass | | | | | | |
| | B-3 (SLIPACKS O) | Parts by mass | | | | | | |
| | C-1 (P-85) | Parts by mass | | 3.5 | | | | 11.0 |
| | C-2 (L-121) | Parts by mass | | | | | | |
| | C-3 (L-31) | Parts by mass | | | 3.5 | | | |
| | C-3 (F-68) | Parts by mass | | | | 3.5 | | |
| | D-4 (#PTMG3000) | Parts by mass | | | | | 3.5 | |
| | Licowax E | Parts by mass | 0.2 | 0.2 | 0.2 | 02 | 0.2 | 0.2 |
| | Irganox 1010 | Parts by mass | 0.2 | 0.2 | 0.2 | 02 | 0.2 | 0.2 |
| Evaluation | Surface hardness | D | 46 | 45 | 45 | 47 | 45 | 40 |
| | MFR (230° C.) | g/10 min | 13 | 14 | 14 | 14 | 14 | 22 |
| | Bleed amount (23° C.) | mg | 5 | 10 | 14 | 6 | 2 | 47 |
| | Water-washing | — | A | B | A | A | B | A |
| | Adherence at low temperature | — | A | A | A | B | B | A |
| | Generation of wear debis | — | None | None | Generated | Generated | Generated | None |
| | Generation of noise | — | Generated | Generated | Generated | Generated | Generated | None |

In Examples 1 to 7, resin compositions having excellent wear resistance, bleeding-out properties, and water resistance that have not been found in conventional techniques were obtained by mixing the polyester elastomer with the aliphatic amide compound (B), which is a specific solid lubricant, and the copolyether (C) comprising two or more different types of alkylene units, which is a liquid lubricant.

In Comparative Example 1, no lubricant component was added. Thus, bleeding out of a lubricant onto the molded article surface did not occur, the wear resistance was poor, and noise was generated when water was dripped on the surface of the test specimen. Since the composition of Comparative Example 1 contained no lubricant component, the composition was not evaluated for water-washing and adherence at low temperature.

Comparative Example 2 is a case of a conventional technique in which an aliphatic monoamide was added. Since the aliphatic monoamide was a solid lubricant, wear occurred during the test, and noise was generated.

Comparative Example 3 is a case of a conventional technique in which a PEG-PPG-PEG copolymer (P-85) was added. The lubricant, which is obtained by copolymerization using hydrophilic polyether components, was scraped off from the surface of the molded article during water-washing, and a high-pitched sound was continuously generated when water was dripped.

Comparative Example 4 is a case in which a low-molecular-weight PEG-PPG-PEG copolymer (L-31) was added. Due to the low molecular weight, Comparative Example 4 was excellent in the bleed amount and adherence at low temperature; however, the lubricant was easily scraped off from the surface of the molded article during the wear test, and noise was generated.

Comparative Example 5 is a case in which a high-molecular-weight PEG-PPG-PEG copolymer (F-68) was added. Because of the high molecular weight, the bleed amount was insufficient, and only an aliphatic monoamide (solid lubricant) bled out on the surface; therefore, the lubricant was easily scraped off from the surface of the molded article during the wear test, and noise was generated.

Comparative Example 6 is a case in which a glycol having a single alkylene chain (PTMG3000) was added. Adherence was observed during the low-temperature test. Further, since the compatibility with the polyester elastomer, which is a matrix, was overly high, the bleed amount was small, and noise was generated when water was dripped.

In Comparative Example 7, due to the excessively large amount of a PEG-PPG-PEG copolymer (P-85) added, sliding properties were exhibited. However, the surface hardness of the molded article itself decreased, and the MFR increased significantly, resulting in a significant decrease in mechanical properties.

INDUSTRIAL APPLICABILITY

The present invention provides a polyester elastomer resin composition having excellent anti-noise properties and wear resistance that achieves sustained wear resistance over a long period of time; enables lubricants to bleed out even in a low-temperature environment, so that the effects of the lubricants are maintained; and further prevents the lubricants from being dissolved in water, even when a molded article is washed with water. Thus, the composition is useful for applications such as automobiles and household electrical appliance parts, which are required to have the above excellent characteristics. In particular, the composition is useful in automotive interiors and members for the suspension system of an automobile, which are required to have high slidability.

The invention claimed is:

1. A polyester elastomer resin composition comprising:
a polyester elastomer (A);
an aliphatic amide compound (B); and
a copolyether (C),
wherein the polyester elastomer (A) comprises a hard segment and a soft segment, the hard segment comprising a polyester that comprises, as constituents, terephthalic acid and 1,4-butanediol, the soft segment being poly(tetramethylene oxide) glycol, wherein the poly(tetramethylene oxide) glycol has a number average molecular weight of 500 to 4000, and a copolymerization amount of the poly(tetramethylene oxide) glycol is 5 to 50 mol % of the entire glycol component,
the polyester elastomer (A) has a reduced viscosity of 1.86 dl/g to 2.8 dl/g,
the copolyether (C) comprises two or more different types of alkylene units and has a number average molecular weight of 1500 to 5000, and
the aliphatic amide compound (B) is present in an amount of 0.01 to 1 part by mass, and the copolyether (C) is present in an amount of 0.1 to 10 parts by mass, per 100 parts by mass of the polyester elastomer (A),
the aliphatic amide compound (B) is at least one selected from the group consisting of an aliphatic monoamide compound having one amide group and being represented by formula (1) and an aliphatic bisamide compound having two amide groups and being represented by formula (2) or (3):

$$R^1\text{—CO—NH—}R^2 \quad (1)$$

$$R^3\text{—CO—NH-}A^1\text{-NH—CO—}R^4 \quad (2)$$

$$R^5\text{—NH—CO-}A^2\text{-CO—NH—}R^6 \quad (3)$$

in formula (1), $R^1$ and $R^2$ each represent any of an alicyclic group having 6 or more carbon atoms, a saturated aliphatic hydrocarbon group having 6 or more carbon atoms, or an unsaturated aliphatic hydrocarbon group having 6 or more carbon atoms, in formulas (2) and (3), $R^3$, $R^4$, $R^5$, and $R^6$ each independently represent a $C_{5-25}$ saturated or unsaturated chain hydrocarbon group, and $A^1$ and $A^2$ each represent a hydrocarbon group selected from a $C_{1-10}$ alkylene group.

2. The polyester elastomer resin composition according to claim 1, wherein the polyester elastomer (A) has an acid value of 50 eq/t or less.

3. The polyester elastomer resin composition according to claim 1, wherein the polyester elastomer (A) has a melting point of 175° C. to 210° C.

4. The polyester elastomer resin composition according to claim 1, wherein the polyester elastomer (A) has an acid value of 50 eq/t or less and a melting point of 175° C. to 210° C.

5. The polyester elastomer resin composition according to claim 1, wherein the composition has a surface hardness (Shore D) of 45 to 46.

* * * * *